(12) United States Patent
Berndt

(10) Patent No.: US 9,856,921 B2
(45) Date of Patent: Jan. 2, 2018

(54) DAMPER PULLEY WITH LEAF SPRING CLUTCH

(71) Applicant: Schaeffler Technologies AG & Co. KG, Herzogenaurach (DE)

(72) Inventor: Eric Berndt, Whitefish Bay, WI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 52 days.

(21) Appl. No.: 14/993,479

(22) Filed: Jan. 12, 2016

(65) Prior Publication Data

US 2016/0201734 A1 Jul. 14, 2016

Related U.S. Application Data

(60) Provisional application No. 62/102,205, filed on Jan. 12, 2015.

(51) Int. Cl.
| | |
|---|---|
| *F16D 7/02* | (2006.01) |
| *F16D 43/21* | (2006.01) |
| *F16D 3/12* | (2006.01) |
| *F16D 13/76* | (2006.01) |

(52) U.S. Cl.
CPC ............. *F16D 3/12* (2013.01); *F16D 7/027* (2013.01); *F16D 43/215* (2013.01); *F16D 43/216* (2013.01); *F16D 13/76* (2013.01)

(58) Field of Classification Search
CPC ..... F16D 3/12; F16D 3/02; F16D 3/00; F16D 13/76; F16D 13/56; F16D 13/54; F16D 13/52; F16D 13/38; F16D 13/22; F16D 13/00; F16D 2013/565; F16D 7/027; F16D 7/025; F16D 7/024; F16D 7/02; F16D 7/00; F16D 41/22; F16D 41/00; F16D 43/216; F16D 43/215; F16D 43/213; F16D 43/21; F16D 43/20; F16D 43/02; F16D 43/00
See application file for complete search history.

(56) References Cited

U.S. PATENT DOCUMENTS

| | | | | |
|---|---|---|---|---|
| 2,351,996 | A | * | 6/1944 | Morgan .................. F16D 41/22 192/33 R |
| 3,092,227 | A | * | 6/1963 | Dossier ................. F16D 41/063 188/67 |
| 4,561,529 | A | * | 12/1985 | McIntosh .............. F16D 43/215 192/56.31 |
| 4,567,974 | A | * | 2/1986 | Birk ....................... F16D 13/46 192/70.18 |
| 4,615,424 | A | * | 10/1986 | Kohler .................... F16D 13/71 192/109 R |
| 4,738,163 | A | * | 4/1988 | Anderson ................. F16H 3/54 192/200 |

(Continued)

*Primary Examiner* — Ramya Burgess
*Assistant Examiner* — David Morris
(74) *Attorney, Agent, or Firm* — Volpe & Koenig, P.C.

(57) ABSTRACT

A damping pulley assembly is disclosed including a pulley with an outer flange and a fixed pulley plate. A floating pulley clutch plate is located within and engaged with the outer flange. Circumferentially spaced apart leaf springs are connected to a pulley hub. Second ends of the leaf springs are connected to a driven hub that includes a fixed hub plate. Floating clutch plates are located between the fixed pulley plate and the fixed hub plate, which are biased toward the fixed pulley plate by the leaf springs so that the clutch plates contact one another and/or the fixed hub or pulley plates.

14 Claims, 2 Drawing Sheets

(56) References Cited

U.S. PATENT DOCUMENTS

| | | | | | |
|---|---|---|---|---|---|
| 4,901,831 | A | * | 2/1990 | Ito | B62D 5/043 |
| | | | | | 180/444 |
| 6,093,991 | A | * | 7/2000 | Tanaka | H02K 7/10 |
| | | | | | 192/45.008 |
| 6,200,221 | B1 | * | 3/2001 | Maejima | F16D 3/76 |
| | | | | | 192/56.55 |
| 6,554,113 | B2 | * | 4/2003 | Li | F16D 7/027 |
| | | | | | 192/28 |
| 8,529,387 | B2 | * | 9/2013 | Lannutti | F16D 13/28 |
| | | | | | 192/113.32 |
| 2013/0161150 | A1 | * | 6/2013 | McCrary | F16D 43/04 |
| | | | | | 192/41 R |

* cited by examiner

DAMPER PULLEY WITH LEAF SPRING CLUTCH

INCORPORATION BY REFERENCE

The following documents are incorporated herein by reference as if fully set forth: U.S. Provisional Patent Application No. 62/102,205, filed Jan. 12, 2015.

FIELD OF INVENTION

The present invention relates to a damper pulley which permits rotational damping between a pulley and a shaft.

BACKGROUND

Overrunning clutches are used in many applications in order to transfer torque between drive elements in one direction while allowing slipping and/or damping of torque perturbations in the other direction. The torque can be transferred by drive elements, such as endless traction elements, including belts or chains, or by a gear train via the overrunning clutch to a shaft of an element being driven. Such overrunning clutches are often used in connection with engine accessory drives, such as for an alternator, power steering pump, air conditioning compressor, or other driven element, for example in a motor vehicle.

Overunning clutches are also used in other applications in order to isolate or dampen reverse torques from being transferred to the driven assembly. Many overrunning clutches utilize rollers on ramp surfaces or rocker elements which engage with more force for rotation in one direction and loosen and allow reverse rotation in the other direction. These are used in connection with belt, chain, and/or gear drives. However, these overrunning clutches are complicated assemblies typically including hardened rollers or rockers that must be located between specifically formed surfaces and retained in position. Additionally, overrunning clutches do not provide any damping when they are operating in the overrunning mode.

It would be desirable to provide a simplified rotational damper which permits rotational damping between a drive element and a shaft to allow driving in a first direction and overrunning in a second direction with the additional capability to provide coulomb damping in the overrunning mode.

SUMMARY

Briefly stated, a damping pulley assembly is provided including a pulley having a circumferentially extending body with an outer flange with a drive element engaging surface and an inner surface. The drive element engaging surface can be for a belt, chain, or gear drive. Splines are located on an inner side of the outer flange. A fixed pulley plate extends radially inwardly from the inner side of the outer flange, and at least one floating pulley clutch plate having spline receiving notches is located within the outer flange, with the notches engaged with the splines of the outer flange. A pulley hub having a shaft opening, as well as preferably a radially extending flange, is provided. A plurality of circumferentially spaced apart leaf springs are connected to the pulley hub, preferably by the radially extending flange, at their first ends and second ends of the leaf springs all extend in a first circumferential direction. A driven hub having a radially outer surface is provided and includes a fixed hub plate connected to the radially outer surface. The second ends of the leaf springs are connected to the driven hub. Splines are located on the radially outer surface of the driven hub. At least one floating hub clutch plate having spline receiving notches is arranged around the driven hub. The floating hub clutch plate spline receiving notches are engaged with the splines of the driven hub. The at least one floating hub clutch plate is adjacent to the at least one floating pulley clutch plate, and the clutch plates are located between the fixed pulley plate and the fixed hub plate. The fixed hub plate is biased toward the fixed pulley plate by the leaf springs so that the clutch plates contact one another and/or the fixed hub plate and the fixed pulley plate.

The at least one floating pulley clutch plate is axially movable on the splines of the outer flange, and the at least one floating hub clutch plate is axially movable on the splines of the driven hub.

The clutch plates can be dry or wet clutch plates, depending on the particular application.

In one preferred arrangement, a bearing is located between the pulley and the pulley hub. Preferably, the bearing is an axial and radial plain bearing.

In another aspect, the pulley further comprises a radially extending flange connected to the outer flange and an inner flange having an inner surface that contacts a radial support surface of the bearing and the radially extending flange contacts an axial support surface of the bearing.

In another aspect, a plurality of the floating hub clutch plates and a plurality of the floating pulley clutch plates are provided interdigitated with one another and located between the fixed pulley plate and the fixed hub plate. Preferably, the clutch plates are made of organic or cerametallic material for a dry clutch arrangement, or wet friction paper for a wet clutch arrangement.

In one arrangement, the pulley is a deep drawn or stamped sheet metal part.

The splines can have a square, wave-shaped or any other suitable cross-sectional profile that provides for rotational engagement and axial slidability of the clutch plates.

The springs may be single leaf or multi-leaf springs, depending on the closing force required for the particular application.

In another aspect, a method for rotational damping between a pulley and a shaft is provided and includes providing a damping pulley assembly as noted above; rotating the pulley in a second circumferential direction, opposite the first circumferential direction, generating frictional forces between the fixed pulley plate, the at least one floating hub clutch plate, the at least one floating pulley clutch plate, and the fixed hub plate due to a bias of the leaf springs and a self-locking force generated by the rotation to transfer torque to a shaft; and for a rotation of the pulley in the first circumferential direction, allowing the pulley to rotate relative to the hub.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Figure 1:
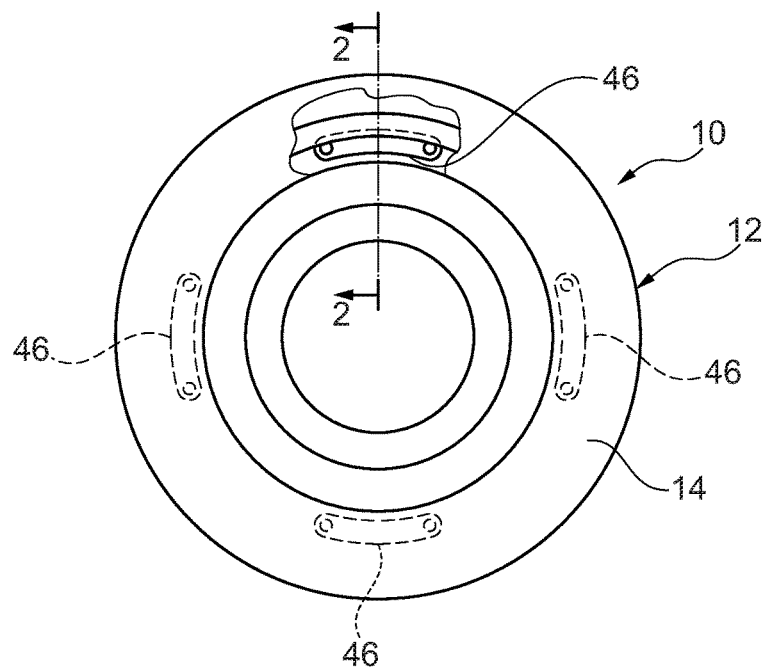
FIG. 1 is an elevational view of a damping pulley assembly in accordance with an embodiment of the invention.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft or rotating part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

FIGS. 1-4 show an embodiment of a damper pulley assembly 10. The damper pulley assembly 10 includes a pulley 12 having a circumferentially extending body 14 as shown in FIG. 1, with an outer flange 16 having a drive engaging surface 18. The drive engaging surface 18 shown is for a belt drive; however, it could also be for a toothed surface for a chain drive, or for gear teeth for a gear train drive, or a friction surface. Accordingly, as used herein, the term "pulley" is generic to these various types of drives and is not limited to belt drives. The pulley 12 is preferably formed from sheet metal by a deep drawing or punching process and includes a radially extending flange 20 as well as an inner flange 22 that includes an inner surface 24. However, the pulley 12 can be formed by other processes, such as machining or powder metallurgy, or other suitable methods. Splines 26 are located on an inner side of the outer flange 16, as shown in detail in FIGS. 3 and 4. The splines 26 can have a square, wave-shaped, or any other suitable cross-sectional profile that provides for rotational engagement and axial slidability of an engaged part with a complementary shape.

A fixed pulley plate 28 is connected to the inner side of the outer flange 16 and extends radially inwardly. At least one floating pulley clutch plate 30 having spline receiving notches 32 is engaged with the splines 26 of the outer flange 16. In the embodiment illustrated in FIG. 2, four floating pulley clutch plates 30 are shown. However, the number can be varied, depending upon the particular torque beam transferred and the particular application. Preferably, the floating pulley clutch plates are formed from an organic or cerametallic friction clutch material for a dry friction clutch. However, for a wet clutch arrangement, a wet friction clutch paper material can be used for the floating pulley clutch plate 30.

Figure 2:
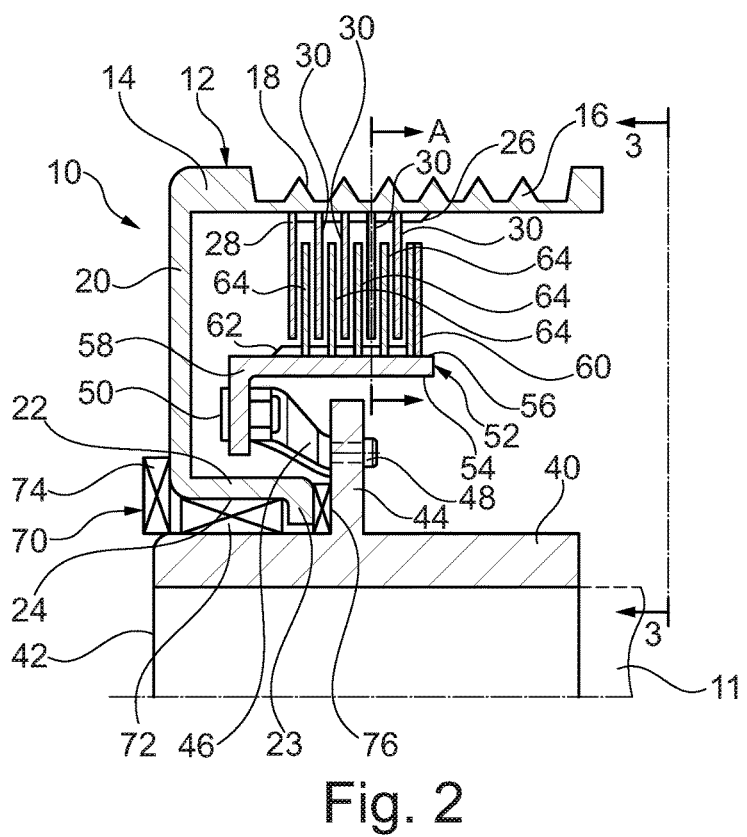
FIG. 2 is a cross-sectional view taken along line 2-2 in FIG. 1.
Figure 3:
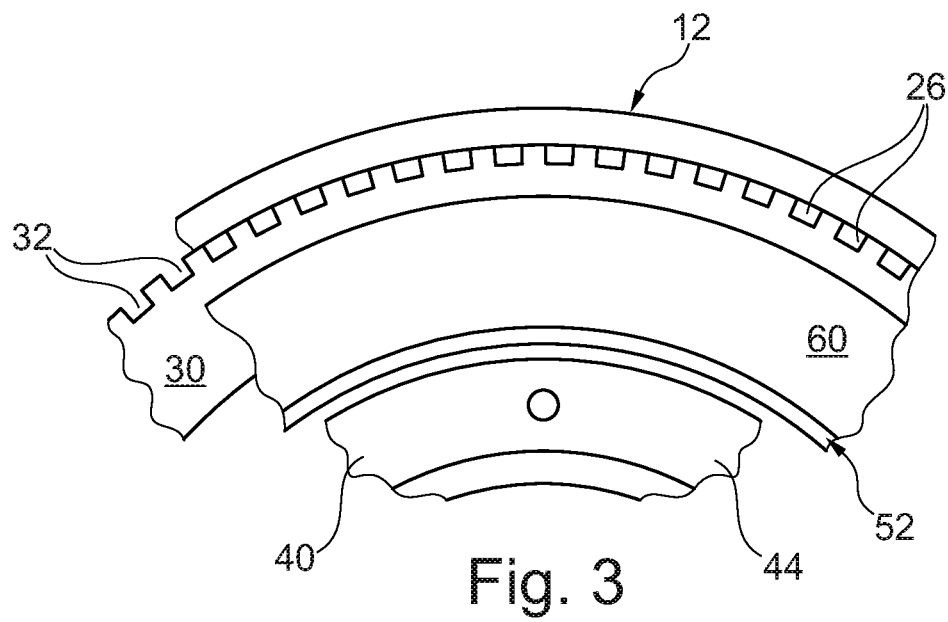
FIG. 3 is a partial rear view, taken along line 3-3 in FIG. 2.

Still with reference to FIG. 2, a pulley hub 40 having a shaft opening 42 and a radially extending flange 44 is shown. The pulley hub 40 can be a machined part, a forged part, a powder metal part, or formed by various other means. A plurality of circumferentially spaced apart leaf springs 46 are connected by their first ends to the pulley hub 40, preferably at the radially extending flange 44. The second ends of the leaf springs 46 all extend in a first circumferential direction. As shown in FIG. 1, the leaf springs 46 are preferably equally spaced about the damping pulley assembly in the circumferential direction. While FIG. 1 shows four of the leaf springs 46, the number can be varied, depending upon the force that is to be generated by the leaf springs 46 and the torque to be transferred. Additionally, it possible for each of the leaf springs 46 to be made up of a multi-leaf spring. Preferably, the first ends of the leaf springs 46 are connected to the radially extending flange 44 using fasteners 48, which can be rivets or any other suitable fastener, such as bolts, or the connection may be welded.

A driven hub 52 is located between the pulley hub 40 and the outer flange 16 of the pulley 12. The driven hub 52 preferably has an axially extending flange 54 with a radially outer surface 56. A fixed hub plate 60 is connected to the radially outer surface 56. The second ends of the leaf springs 46 are connected to the driven hub 52. In the arrangement shown in FIG. 2, the driven hub 52 includes a radially extending flange 58 and the second ends of the leaf springs 46 are connected via fasteners 50, which are preferably rivets, to the radially extending flange 58. However, other types of fasteners could be utilized, such as bolts, or the connection can be welded, if desired.

Figure 4:
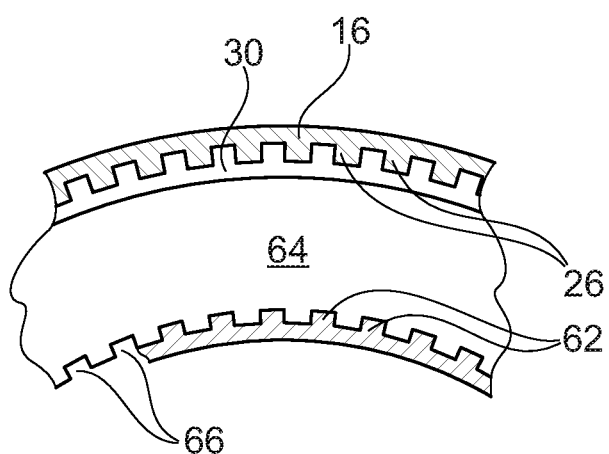
FIG. 4 is a partial cross-section view taken along line 4-4 in FIG. 2.

Splines 62 are located on the radially outer surface 56 of the driven hub 52. The splines 62 can have a square, wave-shaped, or any other suitable cross-sectional profile that provides for rotational engagement and axial slidability of an engaged part having a complementary shape. At least one floating hub clutch plate 64 having spline receiving notches 66, shown in FIG. 4, is engaged with the splines 62 of the inner hub 52. In the embodiment shown, four of the floating hub clutch plates 64 are provided interdigitated with the floating pulley clutch plates 30. However, the number of floating hub clutch plates 64 can also be varied, depending upon the particular application and torque to be transferred. All of the clutch plates 30, 64 are located between the fixed pulley plate 28 and the fixed hub plate 60. The fixed hub plate 60 is biased toward the fixed pulley plate 28 by the leaf springs 46 so that the clutch plates 30, 64 contact one another and/or the fixed hub plate 60 and the fixed pulley plate 28.

Preferably, a bearing 70 is located between the pulley 12 and the pulley hub 40. The bearing 70 is preferably an axial and radial plain bearing and includes a radial support surface 72 and an axial support surface 74 for supporting the inner flange 22 of the pulley and the radially extending flange 20. The bearing 70 can be made of a metallic or polymeric material, or a rolling element bearing would also be suitable. Relative rotation between the pulley 12 and the bearing is limited, and the axial support 74 servers as a primary support for holding the pulley 12 in position axially against the force of the leaf springs 46. Additionally an axial bearing 76 is located between the pulley 12 and the radially extending flange 44 of the pulley hub 40, preferably against a radially inwardly directed inner rim 23 optionally provided on the pulley 12. The axial bearing 76 can be made of a metallic or polymeric material, or a rolling element bearing would also be suitable. This allows axial clamping of the assembly together using a nut (not shown) on a threaded extension of a shaft 11 to control the preload on the leaf springs 46.

The at least one floating pulley clutch plate 30 is axially movable on the splines 26 of the outer flange 16 and the at least one floating hub clutch plate 64 is axially movable on the splines 62 of the inner hub 52. Based on this, when the pulley is being driven in the second circumferential direction, torque flows from the pulley 12 through the fixed pulley plate 28, the floating pulley clutch plates 30, the floating hub clutch plates 64, the fixed hub plate 60, the driven hub 52, the leaf springs 46, through the pulley hub 40 to the shaft 11. The friction forces created between the fixed pulley plate 28, the floating hub clutch plates 64, the floating pulley clutch plates 30, and the fixed hub plate 60 causes the fixed hub plate 60 to press more firmly in the axial direction toward the fixed pulley plate 28 due to the geometry of the leaf springs 46, increasing the clamping load and the torque carrying capacity of the damping pulley assembly 10. When the torque on the pulley 12 is reversed and it is rotated in the opposite, first circumferential direction, the geometry of the leaf springs 46, whose second ends all extend in a first circumferential direction, causes the fixed hub plate 60 to move axially away from the fixed pulley plate 28, decreasing the clamping load and allowing rotation of the pulley 12 relative to the driven hub 52 and the attached pulley hub 40. The balance between the drive and coast torques can be controlled by the number and angle of the leaf springs 46 as well as their biasing force.

This arrangement is shown as a "dry" clutch. However, by encapsulating the area from the fixed pulley plate 28 to fixed hub plate 60 or running the entire assembly in a wet chamber, this can provide a wet clutch solution by providing a hydraulic medium in the area of the floating pulley clutch plates 30 and floating hub clutch plates 64.

In a method for rotational damping between a pulley and a shaft according to the invention, the damping pulley assembly 10 is provided. Rotating the pulley 12 in the second circumferential direction, opposite the first circumferential direction, generates frictional forces between the fixed pulley plate 28, the at least one floating hub clutch plate 64, the at least one floating pulley clutch plate 30, and the fixed hub plate 60 due to the bias of the leaf springs 46 and the self-locking force generated by the rotation to transfer torque to the shaft connected to the pulley hub 40. For a rotation of the pulley 12 in the first circumferential direction, the pulley 12 is allowed to rotate relative to the hub 40 due to the geometry of the leaf springs 46.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

GUIDE TO REFERENCE ELEMENTS

10 Damping pulley assembly
11 Shaft
12 Pulley
14 Circumferentially extending body
16 Outer flange
18 Belt engaging surface
20 Radially extending flange
22 Inner flange
23 Inner Rim
24 Inner surface
26 Splines
28 Fixed plate
30 Floating clutch plates
32 Spline receiving notches
40 Pulley hub
42 Shaft opening
44 Radially extending flange
46 Leaf spring
48 Fastener
50 Fastener
52 Driven hub
54 Axially extending flange
56 Outer surface
58 Radially extending flange
60 Fixed hub plate
62 Splines
64 Floating clutch plates
66 Spline receiving notches
70 Bearing
72 Radial support surface
74 Axial support surface
76 Axial Bearing

What is claimed is:

1. A damping pulley assembly, comprising:
   a pulley having a circumferentially extending body with an outer flange and an inner surface;
   splines located on an inner side of the outer flange;
   a fixed pulley plate extending radially inwardly from the inner side of the outer flange;
   at least one floating pulley clutch plate having spline receiving notches engaged with the splines of the outer flange;
   a pulley hub having a shaft opening;
   a plurality of circumferentially spaced apart leaf springs, each having a first end and a second end, the first ends connected to the pulley hub and the second ends all extending in a first circumferential direction;
   a driven hub having a radially outer surface, a fixed hub plate connected to the radially outer surface, and the seconds ends of the leaf springs are connected to the driven hub;
   splines located on the radially outer surface of the driven hub; and
   at least one floating hub clutch plate having spline receiving notches engaged with the splines of the driven hub, the at least one floating hub clutch plate being adjacent to the at least one floating pulley clutch plate, and all of the clutch plates being located between the fixed pulley plate and the fixed hub plate, wherein the fixed hub plate is biased toward the fixed pulley plate by the leaf springs so that the clutch plates contact at least one of one another, the fixed hub plate, or the fixed pulley plate.

2. The damping pulley assembly of claim 1, further comprising a bearing located between the pulley and the pulley hub.

3. The damping pulley assembly of claim 2, wherein the bearing is an axial and radial plain bearing.

4. The damping pulley assembly of claim 2, wherein the pulley further comprises a radially extending flange connected to the outer flange and an inner flange having an inner surface that contacts a radial support surface of the bearing and the radially extending flange contacts an axial support surface of the bearing.

5. The damping pulley assembly of claim 1, wherein there are a plurality of the floating hub clutch plates and a plurality of the floating pulley clutch plates interdigitated with one another located between the fixed pulley plate and the fixed hub plate.

6. The damping pulley assembly of claim 1, wherein the clutch plates are made of at least one of an organic or cera-metallic friction material.

7. The damping pulley assembly of claim 1, wherein the clutch plates are made of wet friction paper.

8. The damping pulley assembly of claim 1, wherein the pulley hub has a radially extending flange, and the first ends of the leaf springs are riveted to the radially extending flange.

9. The damping pulley assembly of claim 1, wherein the driven hub includes a radially inwardly extending flange, and the second ends of the leaf springs are riveted to the radially inwardly extending flange.

10. The damping pulley assembly of claim 1, wherein the pulley has a belt engaging surface.

11. The damping pulley assembly of claim 1, wherein the pulley is a deep drawn or stamped sheet metal part.

12. The damping pulley assembly of claim 1, wherein the at least one floating pulley clutch plate is axially movable on the splines of the outer flange, and the at least one floating hub clutch plate is axially movable on the splines of the driven hub.

13. A method for rotational damping between a pulley and a shaft; comprising:

provliding a damping pulley assembly including a pulley having a circumferentially extending body with an outer flange and an inner surface; splines located on an inner side of the outer flange; a fixed pulley plate extending radially inwardly from the inner side of the outer flange; at least one floating pulley clutch plate having spline receiving notches engaged with the splines of the outer flange; a pulley hub having a shaft opening and a radially extending flange; a plurality of circumferentially spaced apart leaf springs, each having a first end and a second end, the first ends connected to the radially extending flange and the second ends all extending in a first circumferential direction; a driven hub having an axially extending flange and a radially outer surface, a fixed hub plate connected to the radially outer surface; splines located on the radially outer surface of the driven hub; and at least one floating hub clutch plate having spline receiving notches engaged with the splines of the driven hub, the at least one floating hub clutch plate being adjacent to the at least one floating pulley clutch plate, and all of the clutch plates being located between the fixed pulley plate and the fixed hub plate;

rotating the pulley in a second circumferential direction, opposite the first circumferential direction, generating frictional forces between the fixed pulley plate, the at least one floating hub clutch plate, the at least one floating pulley clutch plate, and the fixed hub plate due to a bias of the leaf springs and a self-locking force generated by the rotation to transfer torque from the pulley to a shaft; and allowing the pulley to rotate relative to the hub when the pulley rotates in the first circumferential direction.

14. The method of claim 13, further comprising damping an angular torque in the first circumferential direction by slipping of at least one of the floating pulley clutch plate, the floating hub clutch plate, the fixed hub plate, or the fixed pulley plate relative to one another.

\* \* \* \* \*